United States Patent
Zimmermann et al.

(10) Patent No.: US 12,224,651 B2
(45) Date of Patent: Feb. 11, 2025

(54) ELECTRIC MOTOR HAVING A FAN GUARD AND ROTOR SHAFT MOUNTED ROTATABLY RELATIVE TO THE FAN GUARD AND ANGLE SENSOR

(71) Applicant: SEW-EURODRIVE GMBH & CO. KG, Bruchsal (DE)

(72) Inventors: Andreas Zimmermann, Karlsruhe (DE); Thomas Knaus, Zeutern (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 323 days.

(21) Appl. No.: 17/782,284

(22) PCT Filed: Nov. 6, 2020

(86) PCT No.: PCT/EP2020/025499
§ 371 (c)(1),
(2) Date: Jun. 3, 2022

(87) PCT Pub. No.: WO2021/110283
PCT Pub. Date: Jun. 10, 2021

(65) Prior Publication Data
US 2023/0041061 A1    Feb. 9, 2023

(30) Foreign Application Priority Data
Dec. 4, 2019  (DE) .......................... 102019008414.4

(51) Int. Cl.
*H02K 9/06* (2006.01)
*F04D 29/70* (2006.01)
(Continued)

(52) U.S. Cl.
CPC ............. *H02K 9/06* (2013.01); *F04D 29/703* (2013.01); *H02K 11/21* (2016.01)

(58) Field of Classification Search
CPC ........ H02K 11/21; H02K 11/215; H02K 9/06; H02K 5/04; H02K 5/24; H02K 5/26;
(Continued)

(56) References Cited

U.S. PATENT DOCUMENTS 5,219,314 A * 6/1993 Her .................... H02K 7/003
                                                   464/84
5,744,706 A * 4/1998 Siraky ................. H02K 5/10
                                                   73/431

(Continued)

FOREIGN PATENT DOCUMENTS

DE    10063013 A1 *  6/2002    ......... G01D 5/34738
DE    19806661 C2    7/2003
(Continued)

OTHER PUBLICATIONS

International Report on Patentability issued in corresponding International Application No. PCT/EP2020/025499 dated May 17, 2022, pp. 1-7, English Translation.
(Continued)

*Primary Examiner* — Edgardo San Martin
(74) *Attorney, Agent, or Firm* — Carter, DeLuca & Farrell LLP

(57) ABSTRACT

An electric motor includes a fan guard and rotor shaft mounted rotatably relative to the fan guard and angle sensor. A housing of the angle sensor is connected to a torque support, which is connected to the fan guard, the torque support having members having a meandering shape.

23 Claims, 5 Drawing Sheets

(51) Int. Cl.
*H02K 5/04* (2006.01)
*H02K 11/21* (2016.01)
*H02K 24/00* (2006.01)

(58) Field of Classification Search
CPC ........ H02K 24/00; G01D 11/30; G01D 5/347; G01D 5/34738; G01D 5/3473; F04D 29/703
See application file for complete search history.

(56) References Cited

U.S. PATENT DOCUMENTS

| | | | | |
|---|---|---|---|---|
| 5,758,427 | A * | 6/1998 | Feichtinger | G01D 11/30 250/231.13 |
| 5,771,594 | A * | 6/1998 | Feichtinger | G01D 11/02 250/231.13 |
| 6,124,654 | A * | 9/2000 | Siraky | H02K 11/21 310/67 R |
| 6,601,307 | B2 * | 8/2003 | Meyer | G01D 5/34738 310/91 |
| 6,668,464 | B2 * | 12/2003 | Mitterreiter | G01D 5/34738 33/708 |
| 6,735,877 | B2 * | 5/2004 | Torr | F16D 1/05 33/1 PT |
| 6,820,511 | B2 * | 11/2004 | Mutschler | G01D 5/24442 73/866.5 |
| 7,926,346 | B2 * | 4/2011 | Glaser | G01D 11/245 73/488 |
| 9,297,423 | B2 * | 3/2016 | Beha | G01D 5/347 |
| 2002/0148123 | A1 * | 10/2002 | Mitterreiter | G01D 5/34738 33/1 PT |
| 2008/0271531 | A1 * | 11/2008 | Glaser | G01P 1/026 73/488 |
| 2024/0027235 | A1 * | 1/2024 | Henshaw | G01D 5/34738 |

FOREIGN PATENT DOCUMENTS

| | | | | |
|---|---|---|---|---|
| DE | 202005019830 | U1 * | 3/2006 | ............ G01D 11/30 |
| DE | 102006038981 | A1 * | 3/2008 | ............ G01B 21/22 |
| DE | 102008059092 | A1 | 5/2010 | |
| DE | 102012004459 | A1 | 9/2013 | |
| DE | 102012024811 | A1 | 6/2014 | |
| DE | 102014005345 | A1 | 10/2015 | |
| DE | 102014007212 | A1 * | 12/2015 | ............ H02K 11/21 |
| DE | 102019003071 | B3 * | 6/2020 | |
| EP | 1353150 | A2 * | 10/2003 | ............ G01D 11/20 |
| EP | 2113989 | A | 11/2009 | |
| EP | 2639942 | A1 * | 9/2013 | ............ H02K 11/21 |
| EP | 3945291 | A1 * | 2/2022 | ............ F16H 57/00 |
| JP | H0285711 | A * | 3/1990 | |
| JP | H0633938 | A * | 2/1994 | |
| JP | 2009300214 | A | 12/2009 | |
| WO | WO-2010000520 | A2 * | 1/2010 | ........... G01D 11/245 |
| WO | WO-2022242903 | A1 * | 11/2022 | ............ H02K 11/21 |
| WO | WO-2022242905 | A1 * | 11/2022 | ............ F04D 25/08 |

OTHER PUBLICATIONS

International Search Report issued in corresponding International Application No. PCT/EP2020/025499 dated Feb. 8, 2021, pp. 1-2, English Translation.

Twk Elektronik "Stator coupling / torque support Model series ZMS58 Stator coupling / torque support for coupling a" (Jan. 2017) https://www.twk.de/data/pdf/12939_e0.pdf, pp. 1-5.

* cited by examiner

ELECTRIC MOTOR HAVING A FAN GUARD AND ROTOR SHAFT MOUNTED ROTATABLY RELATIVE TO THE FAN GUARD AND ANGLE SENSOR

FIELD OF THE INVENTION

The invention relates to an electric motor having a fan guard and a rotor shaft mounted rotatably relative to the fan guard and an angle sensor.

BACKGROUND INFORMATION

In certain conventional systems, an angle sensor for detecting the angular position of the rotor shaft can be arranged on an electric motor.

SUMMARY

Example embodiments of the present invention provide an electric motor, allowing for simple and cost-effective production.

According to an example embodiment of the present invention, an electric motor includes a fan guard and a rotor shaft that is rotatably mounted relative to the fan guard and with an angle sensor. A housing of the angle sensor is connected to a torque support, which is connected to the fan guard. The torque support has meandering and/or meander-like webs, e.g., webs spaced apart from one another in the circumferential direction, and/or the torque support has webs, e.g., webs spaced apart from one another in the circumferential direction, which repeatedly have an increasing and then decreasing circumferential angle as the radial distance from the axis of rotation of the rotor shaft increases, and the respective web and/or each web has regions that are radially spaced apart from one another in a respective circumferential angle region, e.g., within the circumferential angle region covered by the respective web.

The advantage is that tolerances can be compensated for by means of the torque support and a rigid connection can nevertheless be achieved in the circumferential direction. In this manner, the housing of the angle sensor is non-rotatably connected to the fan guard and thus dissipates reaction torques.

Tolerances of components can be compensated for in the axial and radial direction using the torque support. Inexpensive components can thus be readily produced and assembled, e.g., without any particular effort.

According to example embodiments, the housing is connected to an inner ring of the torque support by first and second connecting regions of the torque support. The advantage is that the inner ring is in flat contact and the connection plane is aligned with the housing of the angle sensor.

According to example embodiments, the torque support has tab regions, which, for example, project radially outwardly, to which the fan guard is connected. The advantage is that a flat contact with the fan guard can be achieved and the associated connection plane is therefore aligned with the fan guard, e.g., with the fan grille of the fan guard. Manufacturing tolerances can be compensated for by using the torque support.

According to example embodiments, a respective tab region is connected to the inner ring by webs. The advantage is that the tab regions of the torque support are positioned on a larger radial distance region than the inner ring, so that the webs bridge this radial distance. However, a respective web is, for example, not connected to the inner ring in the same circumferential angle region in which it is connected to the respective tab region. The meander can thus be arranged more efficiently. This is because the meander starts from the connecting region with its first loop tangentially or in the circumferential direction and, after several loops, also ends tangentially or in the circumferential direction in one of the tab regions.

According to example embodiments, the respective tab region is pressed onto the fan guard by a respective fastening device, e.g., a screw. The advantage is that the fastening device protrudes through a recess in the tab region and through a grille opening of the fan grille of the fan guard and then has a pressing effect on both sides when a nut is screwed on, e.g., it presses the tab region onto the fan guard, e.g., secures it in a positive manner.

According to example embodiments, the inner ring and/or the connecting regions are pressed against the housing of the angle sensor by a screw. The advantage is that of an easy fastening.

According to example embodiments, the tab regions are spaced radially from the inner ring and from the connecting regions, in which the radial direction is relative to the axis of rotation of the rotor shaft. The advantage is that the meander can be shaped tangentially or in the circumferential direction with its first and last loop.

According to example embodiments, the respective connecting region is spaced apart from the respective tab region in the circumferential direction. The advantage is that the meander with its first and last loop ends tangentially or in the circumferential direction in the connecting region or in the tab region.

According to example embodiments, the radial distance region relative to the axis of rotation of the shaft and covered by the web is arranged between or overlaps the radial distance region covered by the tab regions and the radial distance region covered by the connecting regions. The advantage is that the web carries out the connection. For example, two of the webs respectively open into a respective tab region and into one of the connecting regions at their other end. The webs are spaced from each other in the circumferential direction.

According to example embodiments, the rotor shaft is rotatably mounted by a bearing accommodated in a bearing flange of the electric motor, and the fan guard is connected to the bearing flange, e.g., is attached to the bearing flange. The advantage is that the reaction torque of the housing of the angle sensor can be transmitted via the torque support and the fan guard to the bearing flange. In contrast, the rotor shaft of the electric motor is connected to the shaft of the angle sensor.

According to example embodiments, the angle sensor has a shaft that can be rotated relative to the housing of the angle sensor and is non-rotatably connected to the rotor shaft. The advantage is that the angular position of the rotor shaft can be detected.

According to example embodiments, the torque support is arranged as a flat stamped sheet metal, with the normal of the plane containing the stamped sheet metal being aligned parallel to the axis of rotation of the rotor shaft. The advantage is that a high level of rigidity can be achieved in the circumferential direction, e.g., with a rotational movement within the plane.

According to example embodiments, the tab regions rest parallel on the fan grille of the fan guard. The advantage is that a rigid configuration in the circumferential direction can be achieved and the torsional rigidity of the torque support can also be combined with a correspondingly torsionally rigid fan guard.

According to example embodiments, the housing of the angle sensor is arranged on the side of the fan guard facing away from the bearing flange. This is considered advantageous in that the angle sensor protrudes on the side facing away from the rotor shaft.

Further features and aspects of example embodiments of the present invention are described in more detail below with reference to the appended schematic Figures.

DETAILED DESCRIPTION

Figure 1:
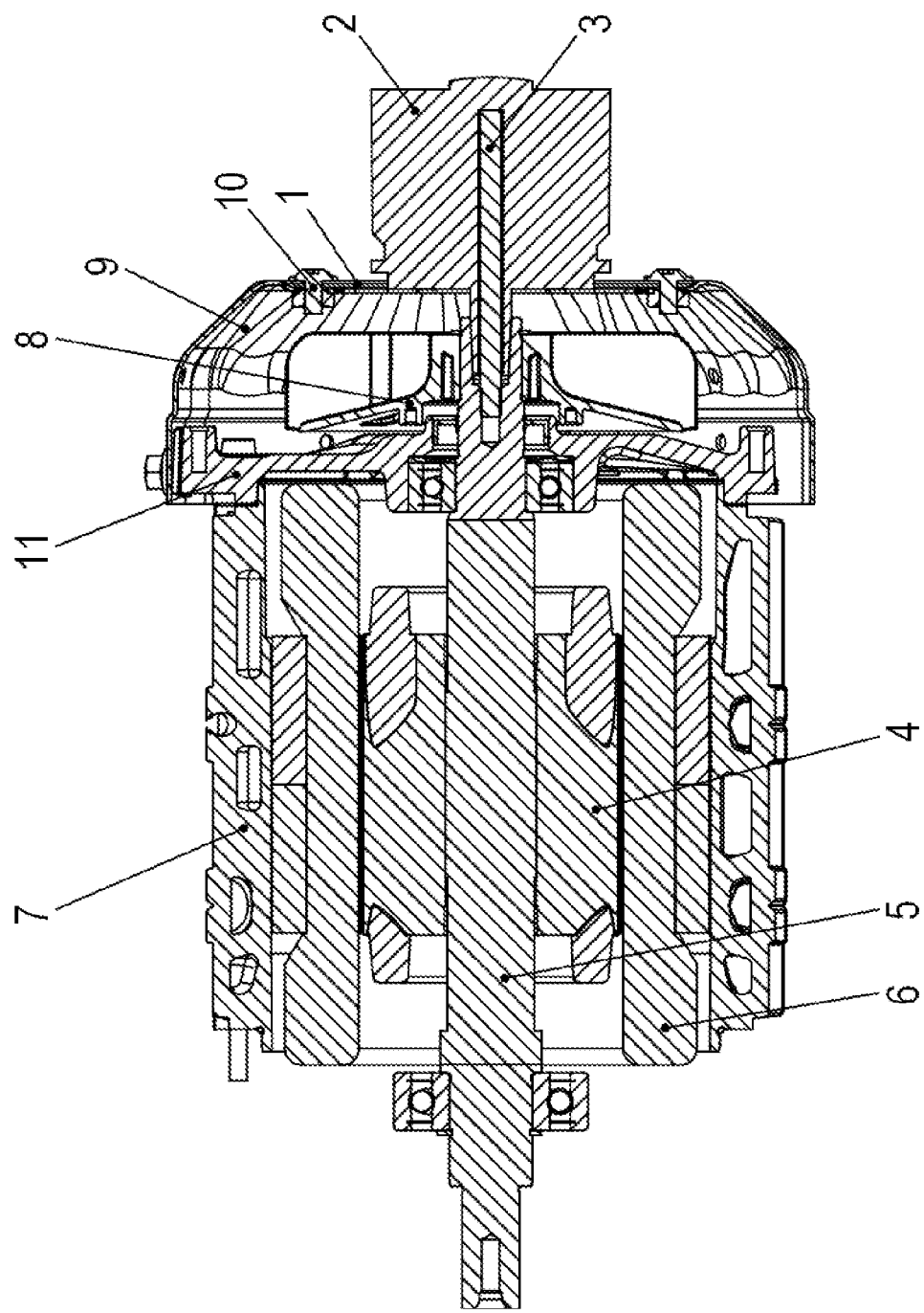
FIG. 1 is a cross-sectional view through an electric motor according to an example embodiment of the present invention, which has an angle sensor for detecting the rotor position of the rotor shaft of the electric motor.

As illustrated in the Figures, the electric motor according to an example embodiment of the present invention has a rotatably mounted rotor shaft 5, onto which an active part 4 is inserted and non-rotatably connected, e.g., with the active part 4 having a squirrel-cage or permanent magnets, depending on whether the electric motor is arranged as an asynchronous motor or as a synchronous motor.

At least one of the bearings rotatably supporting the rotor shaft 5 is accommodated in a bearing flange 11 which is releasably but, e.g., non-rotatably connected to a housing part 7. A stator winding 6 is arranged radially inside the housing part 7 and is non-rotatably connected to the housing part 7.

On the side of the bearing flange 11 facing away from the stator winding 6, a fan guard 9 is fastened to the bearing flange 11, which radially surrounds a fan 8 which is non-rotatably connected to the rotor shaft 5.

The fan guard 9 does have a fan grille, e.g., passing-through recesses arranged in a grille, so that the air flow conveyed by the fan can be guided through the fan grille. On the other hand, the fan guard 9 performs a protective function by preventing people from touching rotatably mounted parts.

The fan guard 9 is made either from plastic as a plastic injection molded part or from sheet metal as a stamped and bent part.

An angle sensor for detecting the angular position of the rotor shaft 5 has a shaft 3 which is rotatable relative to a housing 2 of the angle sensor, e.g., mounted rotatably relative to a housing 2 of the angle sensor.

The housing 2 of the angle sensor is connected to a torque support 1 which is connected to the fan guard 9.

This torque support 1 is configured such that the torque support 1 is more rigid against a rotation between the housing part 2 of the angle sensor and the fan guard 9 in relation to the rotor shaft 5 in the circumferential direction, e.g., against a torsion-type rotation, than against an axially directed displacement and also against a radially directed displacement.

In this manner, manufacturing tolerances of the components, for example, the fan guard together with the bearing flange 11 and/or the rotor shaft 5 together with the shaft 3 of the angle sensor, can be compensated for. For example, tolerances in the axial extent or in the axial direction lead to incorrect axial positioning of the housing 2, which can, however, be compensated for by the torque support 1, which is less rigid in the axial direction.

The torque dissipation cannot be influenced by this, since the torsional rigidity of the torque support 1 is very high and the housing 2 is therefore connected to the bearing flange via the fan guard 9 in a sufficiently non-rotatable manner.

The shaft 3 of the angle sensor is non-rotatably connected to the rotor shaft 5. A non-positive connection such as, for example, an expanded shaft connection or a conical shaft connection is, for example, used for this purpose.

The angle sensor generates a sensor signal that encodes the angular position of the rotor shaft 5 relative to the housing part 7. The angle sensor is configured according to either a magnetic or an optical operating principle.

The bearing of the rotor shaft 5 accommodated in the bearing flange 11 is arranged, for example, as a fixed bearing. An arrangement as a floating bearing is possible, since the torque support 1 couples the housing of the angle sensor to the fan guard 9.

The torque support 1 bears against a, e.g., planar, fan grille of the fan guard 9 and is non-rotatably fastened to the fan guard 9 with at least one fastening device or fastener 10, e.g., a screw with a nut.

A shaft sealing ring is accommodated in the bearing flange axially between the housing 2 and the fixed bearing and seals the bearing flange relative to the rotor shaft 5. For this purpose, the sealing lip of the shaft sealing ring rests on the rotor shaft 5 and touches it.

The torque support 1 has on its radially outer edge radially outwardly protruding tab regions 22, through which one of the fastening devices 10, e.g., a screw, is guided, which also protrudes through the grille of the fan guard 9, e.g., so that the screw head of the fastening device 10, e.g., a screw, and a nut which is screwed onto a threaded portion of the fastener 10 press the torque support 1 against the fan guard 9.

At its radially inner end region, the torque support 1 has an inner ring 23 which is connected to the tab regions 22 via, e.g., four, e.g., meandering, webs 24.

Figure 2:
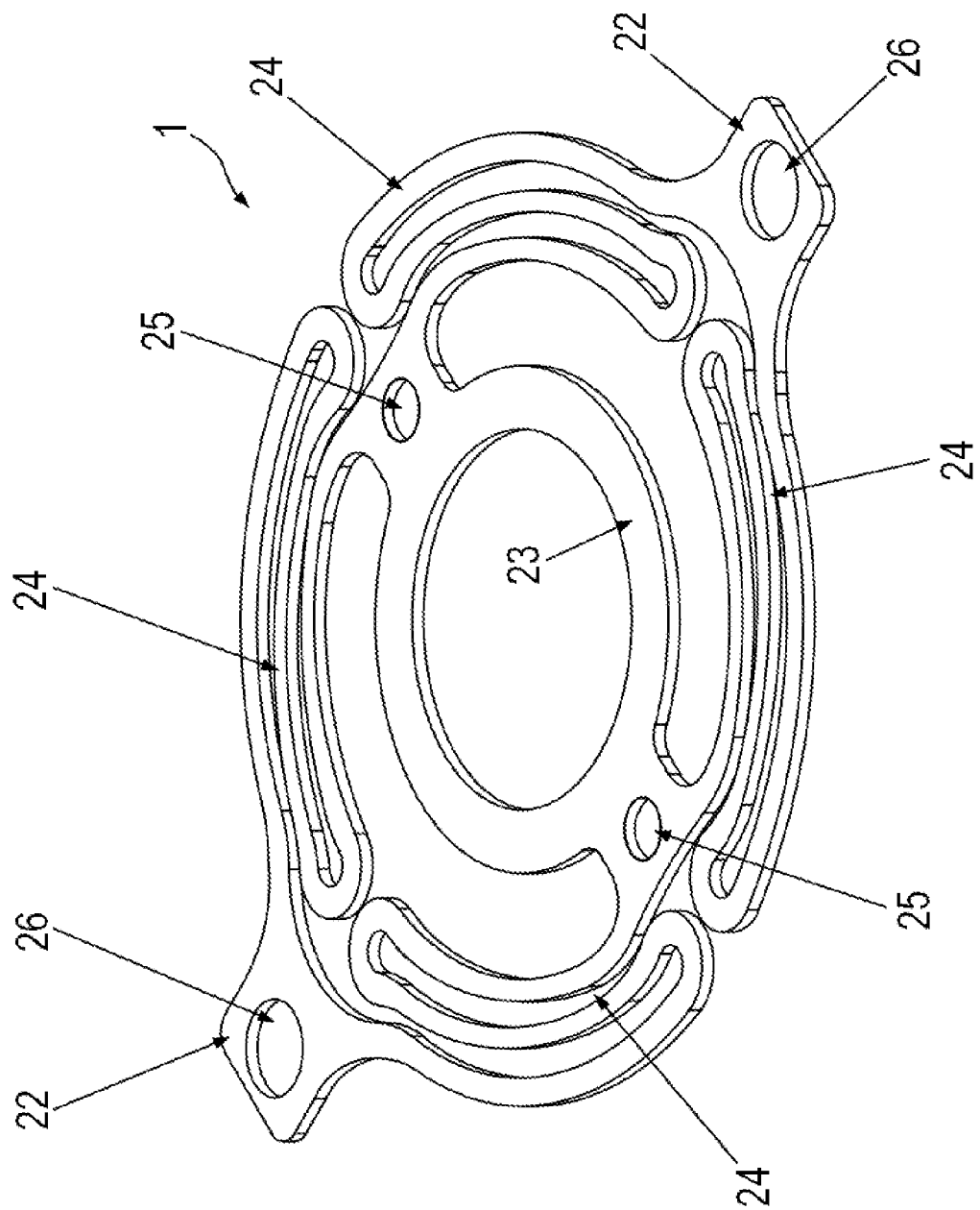
FIG. 2 is a perspective view of a torque support which is connected on the one hand to the housing 2 of the angle sensor and on the other hand to a fan guard 9 of the electric motor.
Figure 3:
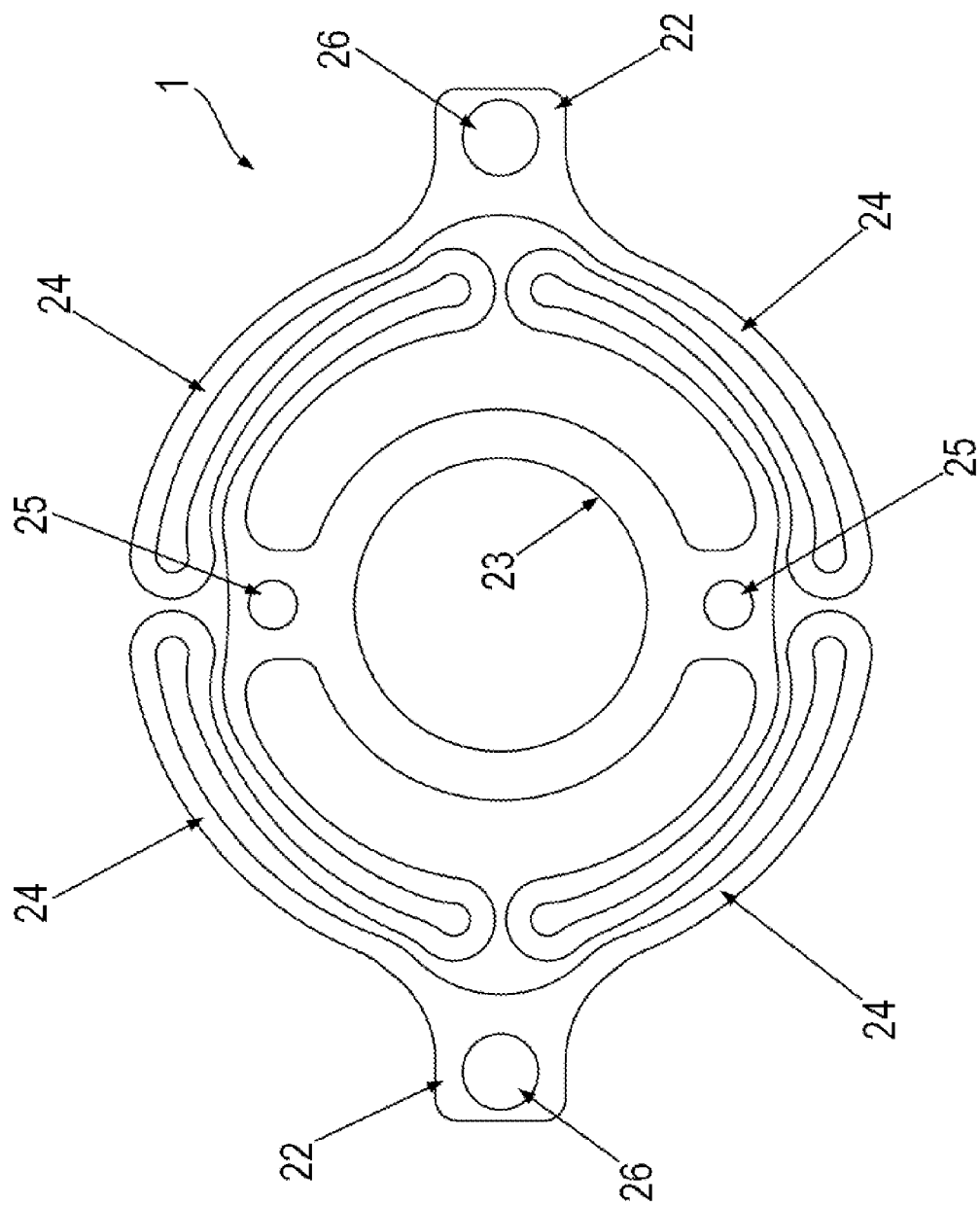
FIG. 3 is a top view of the torque support.

In the example embodiment illustrated in FIGS. 2 and 3, two of the webs 24 are connected to the inner ring 23 in a first connecting region, which covers a first circumferential angle region, with an axially pass-through recess 25 being arranged in this first connecting region, through which another fastening device is passed, which connects the torque support 1 to the housing 2 of the angle sensor, e.g., by pressing thereon. The further fastening device is, for example, also arranged as a screw part, the screw head of which presses the torque support 1 against the housing 2 when the screw part is screwed into an axially directed threaded bore of the housing 2.

Likewise, a second connecting region is formed on inner ring 23 diametrically opposite to the first connecting region, which second connecting region covers a second circumferential angle region, with a second axially pass-through recess 25 being arranged in this second connecting region, through which a second further fastening device is passed, which also connects, e.g., presses, the torque support 1 to the housing 2 of the angle sensor. The further fastening device is, for example, in turn arranged as a screw part, the screw head of which presses the torque support 1 against the housing 2 when the screw part is screwed into a further axially directed threaded bore of the housing 2.

Two of the webs 24 are connected with their radially inner end region to the first connecting region and with their radially outer connecting region to a first of the tab regions 22.

Two of the webs 24 are connected with their radially inner end region to the first connecting region and with their radially outer connecting region to a second of the tab regions 22.

The first tab region 22 is arranged diametrically opposite the second tab region 22, e.g., spaced apart substantially by approximately 180° in the circumferential direction.

The meandering configuration of the respective web 24 is arranged within the plane defined by the torque support 1, which is, for example, arranged as a stamped sheet metal part.

The meandering region is, for example, arranged such that as the radial distance increases, a first of the two webs 24 initially has a circumferential angle that increases up to a maximum value and then has a circumferential angle that decreases to a minimum value, whereupon the circumferential angle then increases again until it reaches the circumferential angle region covered by the tab region 22.

In further exemplary embodiments, the meandering course of the web 24 varies more frequently with an increasing radial distance from the axis of rotation of the rotor shaft and correspondingly more frequently reaches the maximum value or minimum value.

As illustrated in FIGS. 2 and 3, the meandering course of the second web 24 of the two webs 24 in the circumferential direction is mirror-symmetrical to the plane containing the axis of rotation of the rotor shaft and the center point of the recess 26 and/or the barycenter of the first tab region 22.

For example, the other two webs 24 are also mirror-symmetrical to the aforementioned webs 24.

Since the torque support 1 is a flat and planar stamped part made of sheet metal, the respective meander, e.g., the respective meander-like web 24, is arranged in a plane, the normal direction of which is aligned parallel to the axis of rotation of the rotor shaft, and the torsional rigidity with respect to a torsion relative to the axis of rotation is very high. Thus, the detection of the angle with the angle sensor can be carried out with few errors.

In the axial direction, a deflection of the tab regions 22 relative to the axial position of the inner ring 23 is possible with a low force, since the torque support 1 does not have a high level of rigidity with respect to such deflections. Manufacturing tolerances can thus be compensated for without the angle detection being impaired.

Likewise, radial deviations can be accommodated by elastic deflection of the tab regions 22 relative to the inner ring 23.

The webs 24 are, for example, regularly spaced apart from one another in the circumferential direction.

The inner ring 23 is, for example, in contact with the housing 2 of the angle sensor.

Each web 24 covers, e.g., with its meandering course, a circumferential angle region which covers more than 60° and which, for example, is less than 90°.

There is therefore an angular distance of more than 60° between the maximum value and the minimum value, with the angular distance being less than 90°.

The webs 24 are, for example, regularly spaced apart from one another in the circumferential direction.

The fan guard 9 itself, e.g., the grille of the fan guard 9, is made more rigid than the torque support 1.

The radial distance region covered by the webs 24 is arranged between the radial distance region covered by the inner ring 23 and the radial distance region covered by the tab regions 22.

The angular circumferential angle region covered by the first tab region 22 is quantitatively spaced more than 60° apart from the circumferential angle region covered by the first connecting region. The circumferential angle region covered by the first tab region 22 is spaced more than 60° apart from the circumferential angle region covered by the first connecting region.

This permits the meander to be shaped in an optimized manner, e.g., as many meander loops as possible in a small radial distance region.

Correspondingly, an angle between the connecting line connecting the barycenters of the two tab regions 22 and the connecting line connecting the barycenters of the two connecting regions amounts to more than 60°, e.g., 90°.

If the two connecting lines are, for example, aligned perpendicular to one another, a highly precise detection of the angle values by the angle sensor is provided, since the torsional rigidity has the same values both in the circumferential direction and counter to the circumferential direction, e.g., there is no preferential direction. This also applies if there are axial and radial tolerance deviations.

The torque support 1, e.g., a torque support part, is arranged as a one-piece stamped part.

Figure 4:
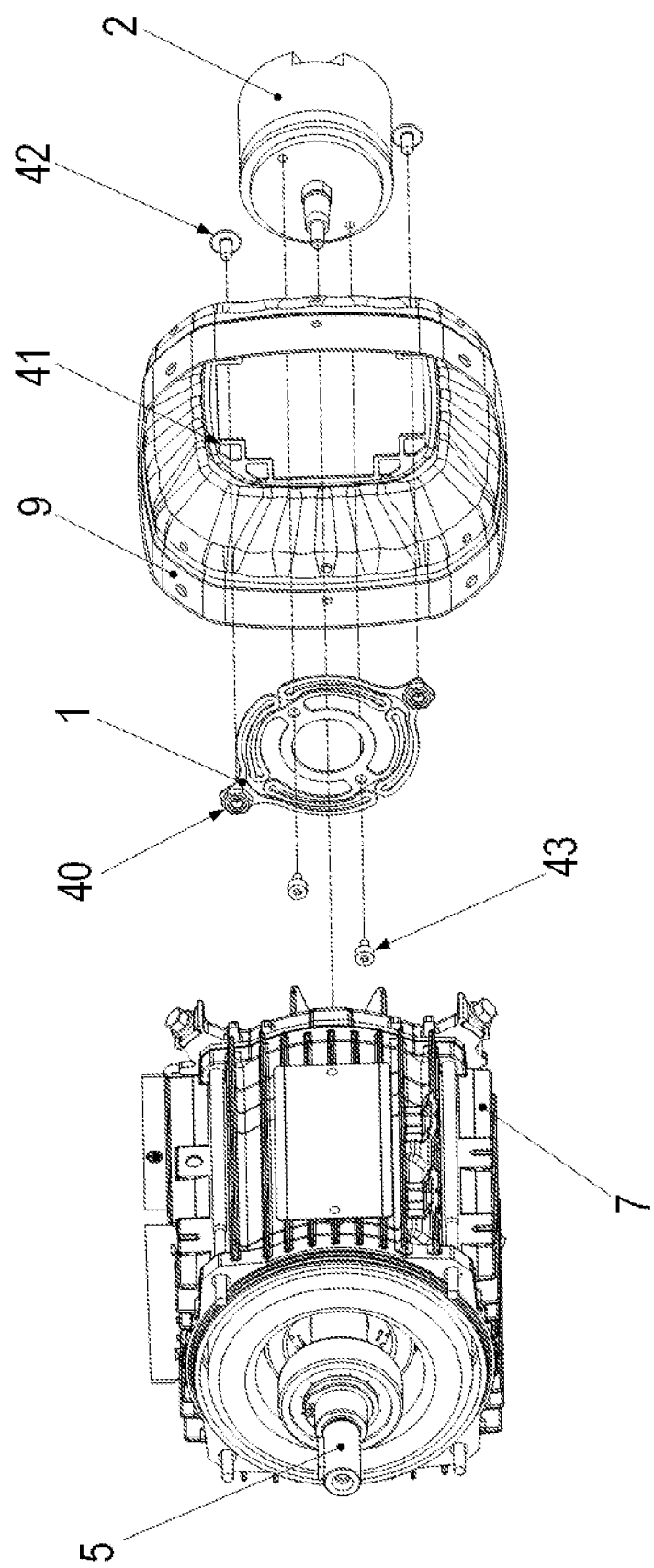
FIG. 4 is an exploded perspective view of the electric motor.
Figure 5:
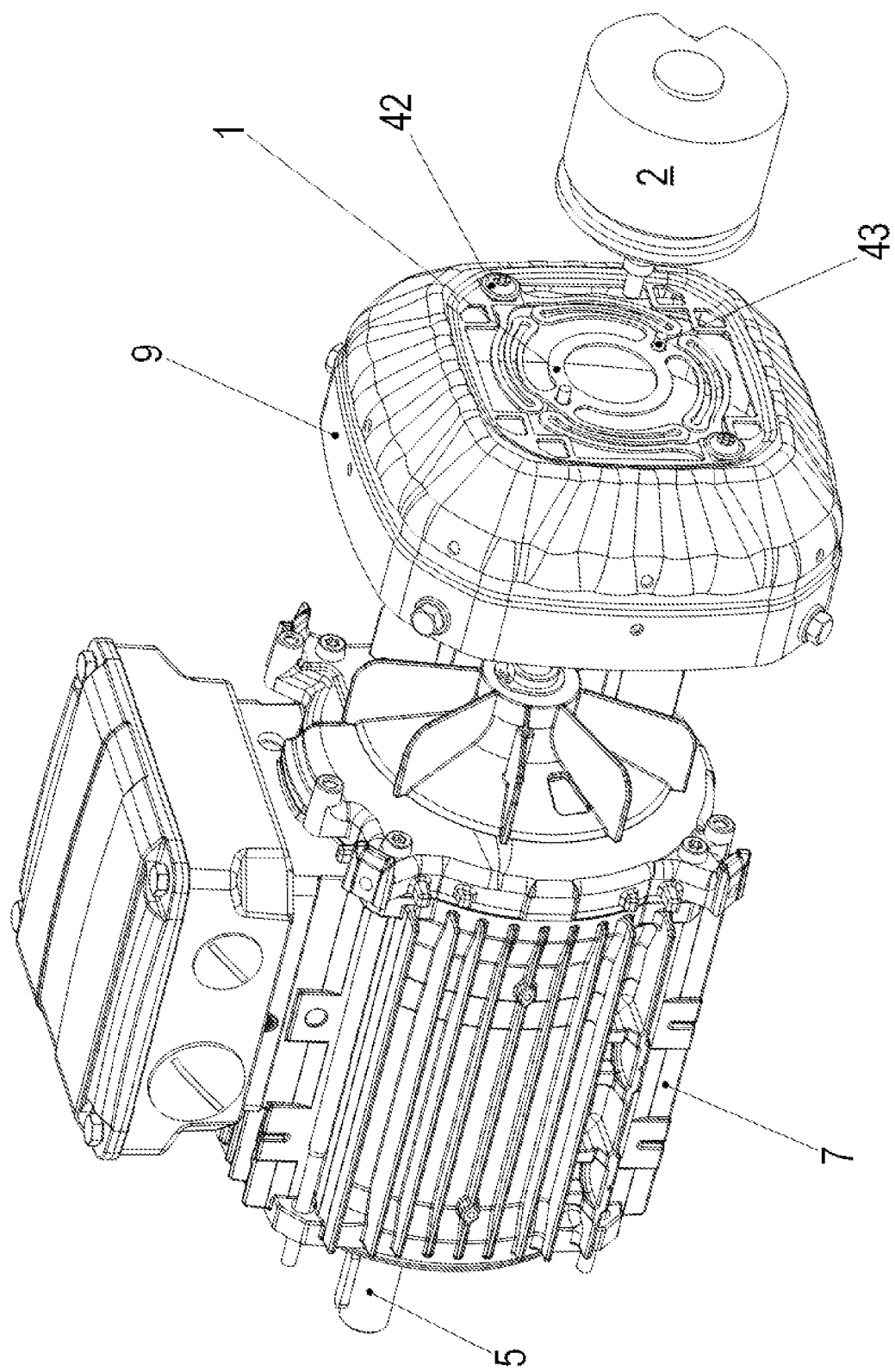
FIG. 5 illustrates the angle sensor and the fan guard 9 separated from the housing part 7 of the electric motor, with the torque support 1 being non-rotatably connected to the fan guard 9 by screws 42.

As illustrated in FIG. 4 and FIG. 5, nuts 40 are welded on the side of the torque support 1 facing the fan guard 9. Thus, the nuts 40 are integrally connected to the torque support 1. Screws 42 protruding through recesses 41 in the fan guard are screwed into the nuts 40. The respective screw head of the respective screw 42 thus presses the fan guard 9 onto the respective nut 40 and the torque support is thus positively connected to the fan guard 9 by screws 42.

The housing part 2 of the angle sensor is positively and thus non-rotatably connected in the circumferential direction, by pins 43 that pass through the torque support 1. The pins 43 are, for example, inserted into bores in the housing 2 in a non-positive manner.

Since the fan guard 9 is also positively connected to the housing part 7, e.g., the stator housing, by screws, the torque is transmitted from the housing 2 of the angle sensor via the torque support 1 and via the fan guard 9 to the housing part 7.

The torque support 1 is therefore arranged on the inside of the fan guard 9 and is therefore protected by the fan guard 9 against the effects of the external environment.

LIST OF REFERENCE NUMERALS

1 torque support
2 housing, e.g., stator, of the angle sensor
3 shaft, e.g., rotor shaft, of the angle sensor
4 active part
5 rotor shaft
6 stator winding
7 housing part
8 fan
9 fan guard
10 fastening device, e.g., screw with nut
11 bearing flange
22 tab region 23 inner ring
24 meander-like web
25 recess
26 recess
40 nut
41 recess
42 screw
43 pin

The invention claimed is:

1. An electric motor, comprising:
a fan guard;
a rotor shaft mounted rotatably relative to the fan guard;
a torque support connected to the fan guard; and
an angle sensor including a housing connected to the torque support;
wherein the torque support has meandering and/or meander-like webs that repeatedly have an increasing and then decreasing circumferential angle as a radial distance from an axis of rotation of the rotor shaft increases;
wherein each web includes regions that are radially spaced apart from one another in a respective circumferential angle region and/or within the circumferential angle region covered by the web.

2. The electric motor according to claim 1, wherein the webs are spaced apart from one another in a circumferential direction.

3. The electric motor according to claim 1, wherein the housing is connected to an inner ring of the torque support by first and second connecting regions of the torque support.

4. The electric motor according to claim 1, wherein the torque support includes tab regions connected to the fan guard.

5. The electric motor according to claim 1, wherein the torque support includes radially outwardly projecting tab regions connected to the fan guard.

6. The electric motor according to claim 4, wherein the housing is connected to an inner ring of the torque support by first and second connecting regions of the torque support, and the tab regions are connected to the inner ring via the webs.

7. The electric motor according to claim 4, wherein the tab regions are pressed onto the fan guard by a fastener.

8. The electric motor according to claim 7, wherein the fastener includes a screw.

9. The electric motor according to claim 3, wherein the inner ring and/or the connecting regions are pressed against the housing of the angle sensor.

10. The electric motor according to claim 3, wherein the torque support includes tab regions connected to the fan guard, and the tab regions are spaced from the inner ring and from the connecting regions in a radial direction relative to an axis of rotation of the rotor shaft.

11. The electric motor according to claim 3, wherein the torque support includes tab regions connected to the fan guard, and the connecting regions are spaced from the tab regions in a circumferential direction.

12. The electric motor according to claim 3, wherein the torque support includes tab regions connected to the fan guard, and a radial distance region relative to an axis of rotation of the shaft and covered by the web is arranged between or overlaps a radial distance region covered by the tab regions and a radial distance region covered by the connecting regions.

13. The electric motor according to claim 1, wherein the rotor shaft is rotatably mounted by a bearing accommodated in a bearing flange of the electric motor, and the fan guard is connected to and/or attached to the bearing flange.

14. The electric motor according to claim 1, wherein the angle sensor includes a shaft that is rotatable relative to the housing of the angle sensor and that is non-rotatably connected to the rotor shaft.

15. The electric motor according to claim 1, wherein the torque support is arranged as a planar stamped metal sheet component, and a normal to a plane containing the stamped metal sheet component is parallel to an axis of rotation of the rotor shaft.

16. The electric motor according to claim 4, wherein the tab regions rest parallel against a fan grille of the fan guard.

17. The electric motor according to claim 13, wherein the housing of the angle sensor is arranged on a side of the fan guard facing away from the bearing flange.

18. The electric motor according to claim 3, wherein a first end of each web is connected to the inner ring.

19. The electric motor according to claim 10, wherein a first end of each web is connected to the inner ring and a second end of each web is connected to one of the tab regions.

20. The electric motor according to claim 10, wherein the webs include:
a first web having a radially inner end connected to a first connecting region of the inner ring and a radially outer end connected to a first one of the tab regions;
a second web having a radially inner end connected to the first connecting region of the inner ring and a radially outer end connected to a second one of the tab regions;
a third web having a radially inner end connected to a second connecting region of the inner ring and a radially outer end connected to the first one of the tab regions; and
a fourth web having a radially inner end connected to the second connecting region of the inner ring and a radially outer end connected to the second one of the tab regions.

21. The electric motor according to claim 20, wherein the first one of the tab regions is arranged diametrically opposite the second one of the tab regions.

22. The electric motor according to claim 20, wherein the first connecting region is arranged diametrically opposite the second connecting region.

23. The electric motor according to claim 21, wherein the first connecting region is arranged diametrically opposite the second connecting region.

* * * * *